United States Patent
Chen

(10) Patent No.: US 7,926,508 B2
(45) Date of Patent: Apr. 19, 2011

(54) WATER CONTROL VALVE SYSTEM WITH SNAPPING ACTION

(75) Inventor: Mei-Li Chen, Tanzih Township, Taichung County (TW)

(73) Assignee: Kuching International Co., Ltd., Tanzih Township, Taichung County (TW)

( * ) Notice: Subject to any disclaimer, the term of this patent is extended or adjusted under 35 U.S.C. 154(b) by 404 days.

(21) Appl. No.: 12/111,047

(22) Filed: Apr. 28, 2008

(65) Prior Publication Data

US 2009/0266423 A1    Oct. 29, 2009

(51) Int. Cl.
*F16K 25/00* (2006.01)
(52) U.S. Cl. .................. 137/315.13; 137/454.6
(58) Field of Classification Search ............. 137/315.13, 137/454.6, 454.2, 454.4, 613
See application file for complete search history.

(56) References Cited

U.S. PATENT DOCUMENTS

| | | | | |
|---|---|---|---|---|
| 4,901,749 A | * | 2/1990 | Hutto | 137/454.2 |
| 4,924,903 A | * | 5/1990 | Orlandi | 137/454.5 |
| 6,497,245 B1 | * | 12/2002 | Torii | 137/315.11 |
| 6,945,264 B1 | * | 9/2005 | Denzel et al. | 137/454.6 |

* cited by examiner

*Primary Examiner* — Kevin L Lee
(74) *Attorney, Agent, or Firm* — Egbert Law Offices PLLC

(57) ABSTRACT

The present invention provides a water control valve with snapping action. The valve shell of the water control valve includes a main body and combined base. A snapping assembly is arranged between the main body and combined base, being in snap-fit engagement, so that the inner space of the valve shell expands to accommodate more switching valve assemblies for better applicability. When the main body is coupled with the combined base, the overlapped portion of the main body and combined base can be reduced by configuration of the snapping assembly, thereby optimizing the utilization of the inner space. So, the switching valve assemblies of different dimensions and specifications are suitable for a wider range of applications.

1 Claim, 7 Drawing Sheets

WATER CONTROL VALVE SYSTEM WITH SNAPPING ACTION

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a water control valve system with snapping action, and more particularly to an innovative snapping assembly for a water control valve.

2. Description of Related Art

Including Information Disclosed Under 37 CFR 1.97 and 37 CFR 1.98.

The cold/hot water switching of a single-handle faucet is typically implemented through a water control valve within the main body of the faucet. A conventional water control valve unit is equipped with a brake stem assembly, a switching valve assembly, and a valve seat.

The following shortcomings are observed during actual applications. First, as the brake stem assembly, switching valve assembly, and valve seat are accommodated in the valve shell, the inner space of the valve shell will be reduced as the aforementioned control components are assembled separately. So, a valve shell is only adapted with control components of certain specifications. Since the production line is required to produce the control components matching every valve shell, this requirement will yield lower economic efficiency with respect to the manufacturing cost and market potential.

Thus, to overcome the aforementioned problems of the prior art, it would be an advancement in the art to provide an improved structure that can significantly improve efficacy.

Therefore, the inventor has provided the present invention of practicability after deliberate design and evaluation based on years of experience in the production, development and design of related products.

BRIEF SUMMARY OF THE INVENTION

The enhanced efficacy of the present invention is that the main body and combined base are positioned by locking a snapping portion and snapping hole. Thus, the valve is assembled easily and conveniently. Moreover, with the configuration of at least a combined base, the inner space of the valve shell can be expanded to accommodate more switching valve assemblies for better applicability.

There are improvements brought about by this invention. When the main body is coupled with the combined base, only the bulge is overlapped with the lateral wall of the main body, thus reducing the overlapped portion of the main body and combined base for optimized utilization of the inner space. So, the switching valve assemblies of different dimensions and specifications are suitable for a wider range of applications.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
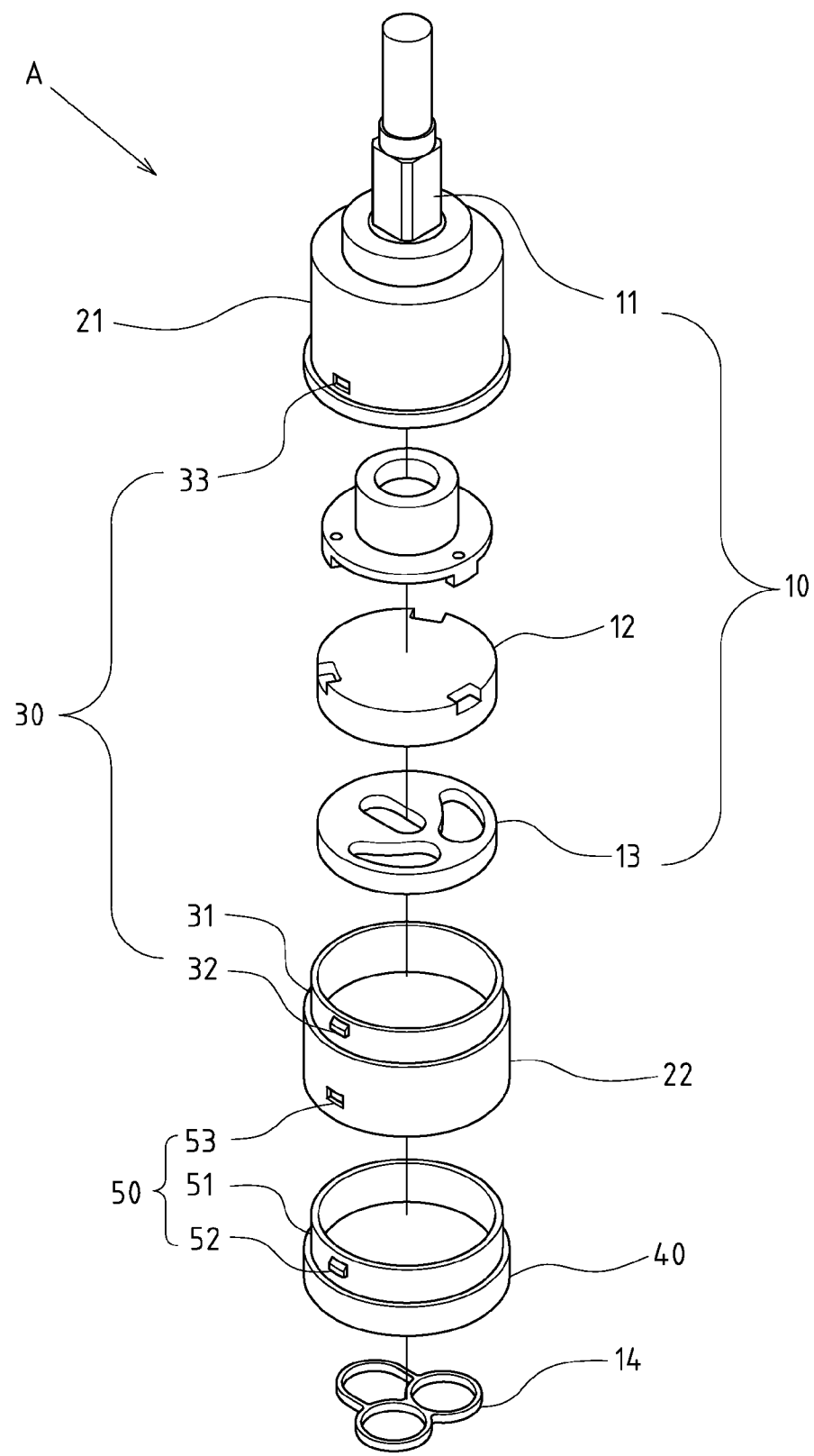
FIG. 1 shows an exploded perspective view of the present invention.
Figure 2:
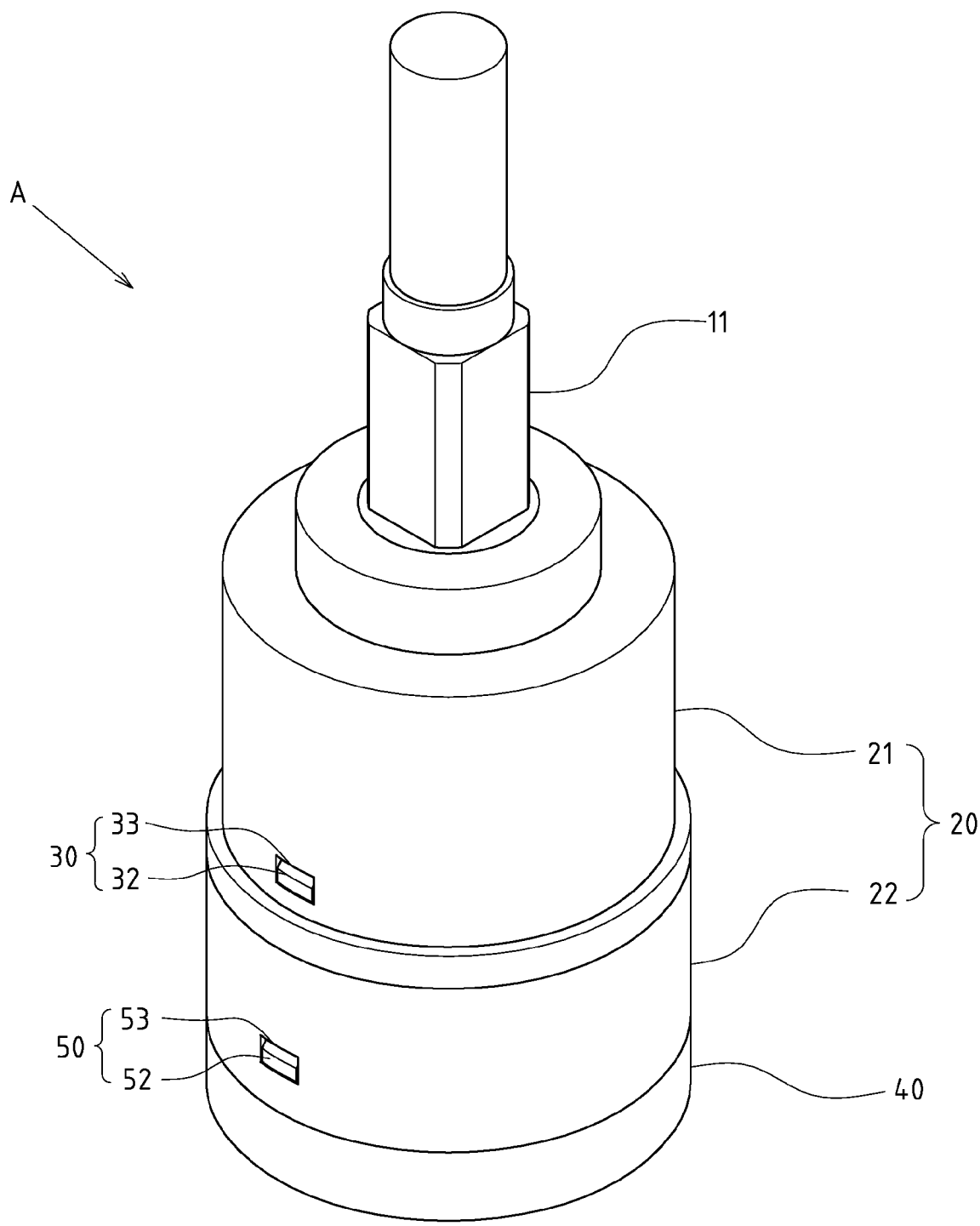
FIG. 2 shows an assembled perspective view of the present invention.

The features and the advantages of the present invention will be more readily understood upon a thoughtful deliberation of the following detailed description of a preferred embodiment of the present invention with reference to the accompanying drawings.

FIGS. 1-4 depict preferred embodiments of a water control valve system with a snapping action of the present invention. The embodiments are provided only for explanatory purposes with respect to the patent claims.

The water control valve A comprises a switching valve assembly 10 comprised of a brake deflector assembly 11, an upper switching valve seat 12, a lower switching valve seat 13 and watertight ring 14. The switching valve assembly 10 is assembled into the valve shell 20, which is composed of a main body 21 and a combined base 22. A snapping assembly 30 is arranged between the main body 21 and combined base 22, being fixed in a snap-fit engagement.

The snapping assembly 30 allows a circular portion 31 to protrude from the top of the combined base 22. A snapping portion 32 is placed at a preset location on the circular portion 31, and a snapping hole 33 is placed on the main body 21 corresponding to the snapping portion 32.

The combined base 22 could be mated with the other combined base 40 via the other snapping assembly 50. A circular portion 51 is arranged at top of the combined base 40. The circular portion 51 is provided with a snapping portion 52, and a snapping hole 53 is provided correspondingly at the bottom of the combined base 22.

Figure 3:
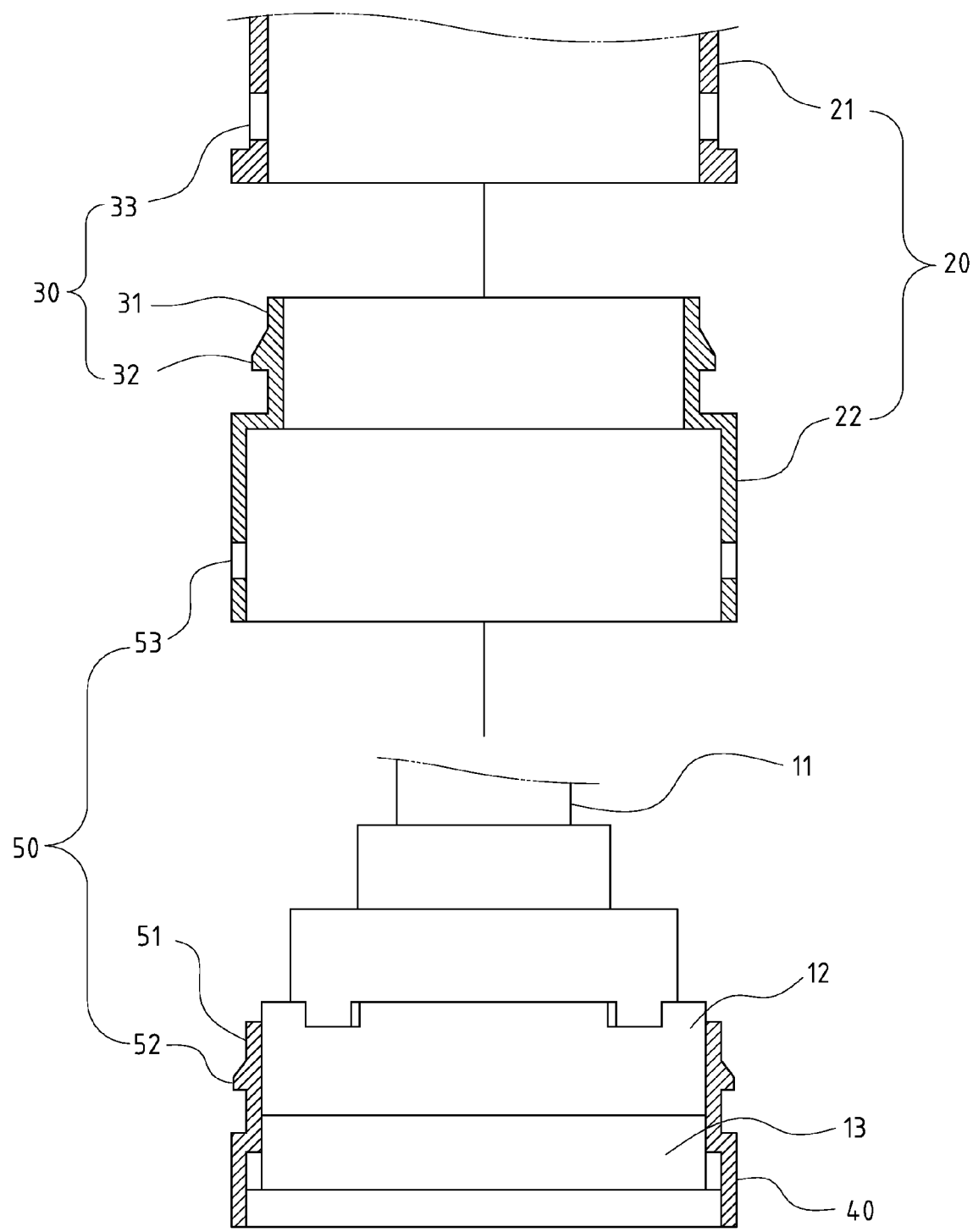
FIG. 3 shows an exploded sectional view of the present invention.
Figure 4:
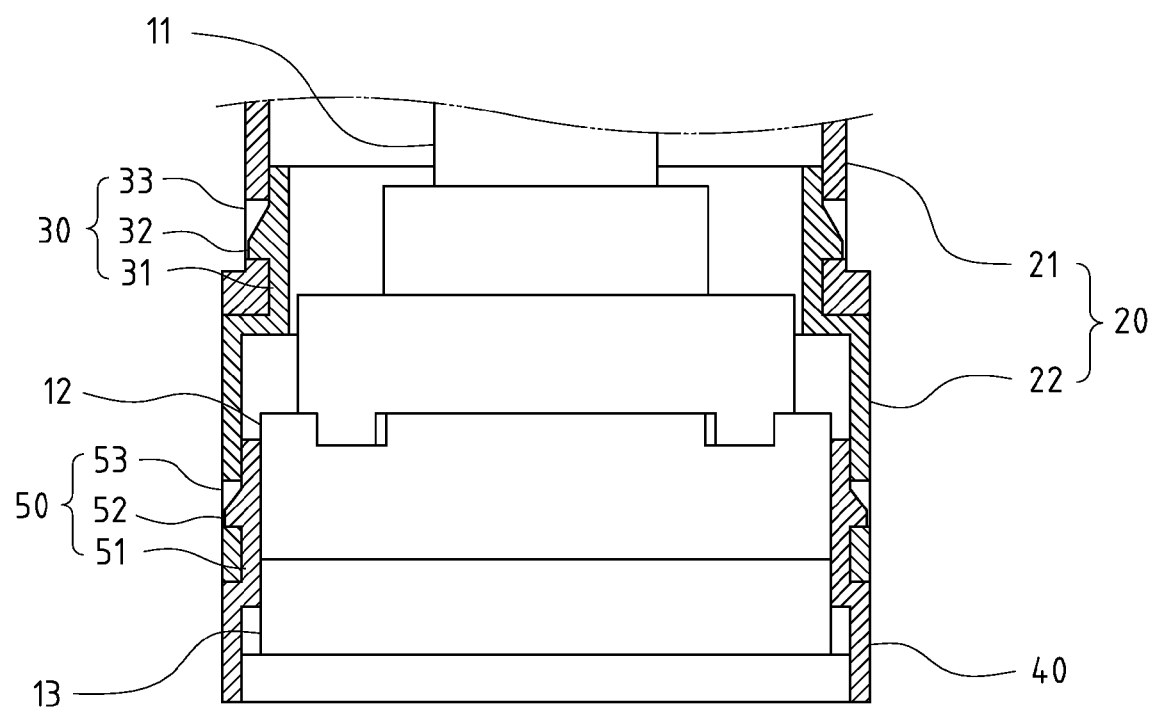
FIG. 4 shows an assembled sectional view of the present invention.

Based upon above-specified structures, the present invention is operated as follows:

Referring to FIGS. 3 and 4, when the spare parts of switching valve assembly 10 are separately assembled into the valve shell 20, the snapping portion 32 at circular portion 31 of combined base 22 is aligned with the snapping hole 33 of the main body. The snapping portion 32 of the snapping assembly 30 is flexibly locked with the snapping hole 33, so that the inner space of the main body expands with the configuration of combined base 22. The combined base 22 can then be coupled with the other combined base 40. Likewise, the snapping portion 52 of the combined base 40 is locked with the snapping hole 53 at bottom of the combined base 22, so that the combined bases 22, 40 could be coupled and expanded flexibly.

Figure 5:
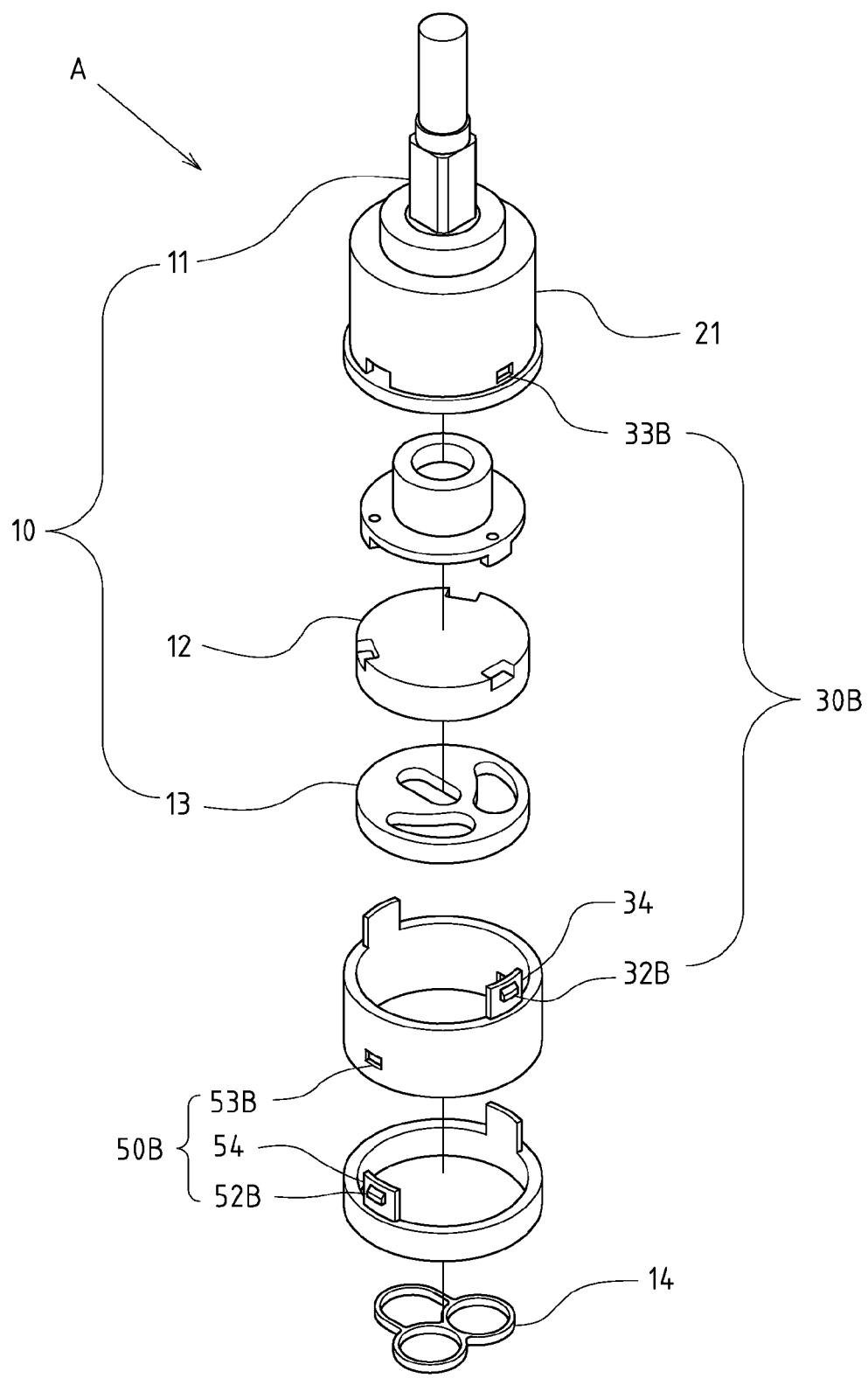
FIG. 5 shows another perspective view of the application of the present invention.

Referring to FIG. 5, the snapping assembly 30B allows a bulge 34 to protrude from the top of the combined base 22. The bulge 34 is provided with a snapping portion 32B, and a snapping hole 33B is arranged onto the main body 21 corresponding to the snapping portion 32B.

The combined base 22B can be coupled with the other combined base 40B with the configuration of the other snapping assembly 50B. A bulge 54 is placed at top of the combined base 40B. The bulge 54 is provided with a snapping portion 52B, and a snapping hole 53B is arranged correspondingly to the bottom of the combined base 22B.

Figure 6:
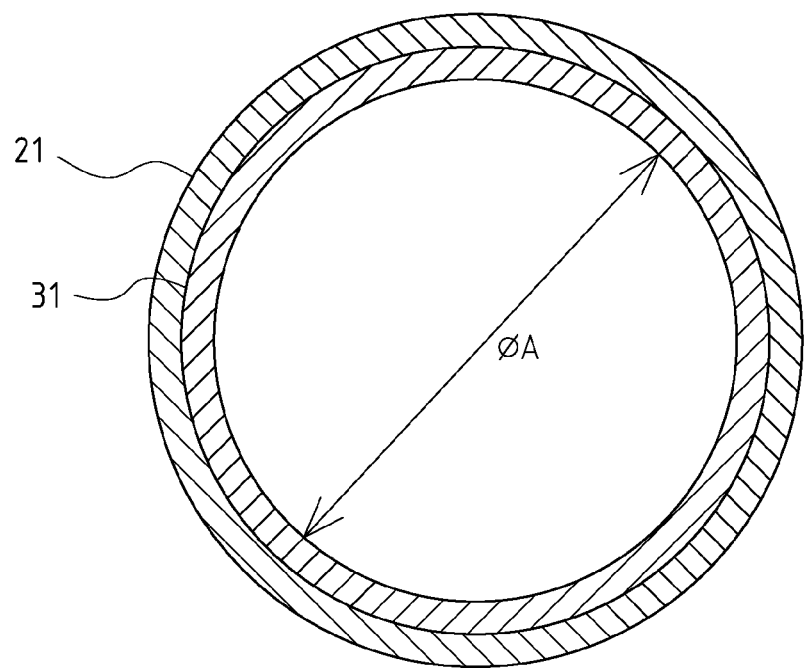
FIG. 6 shows an overhead assembled sectional view of the present invention.
Figure 7:
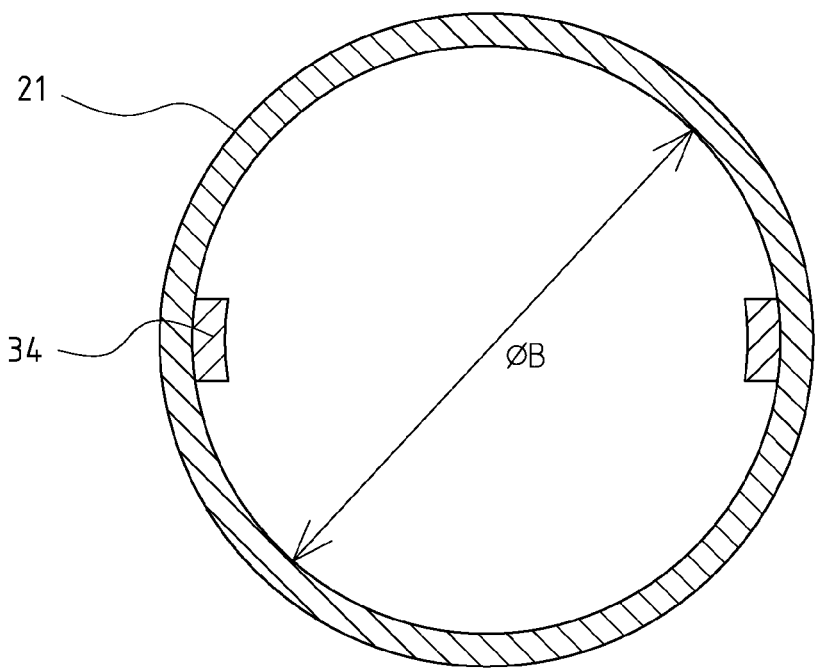
FIG. 7 shows another overhead assembled sectional view of the present invention.
Figure 8:
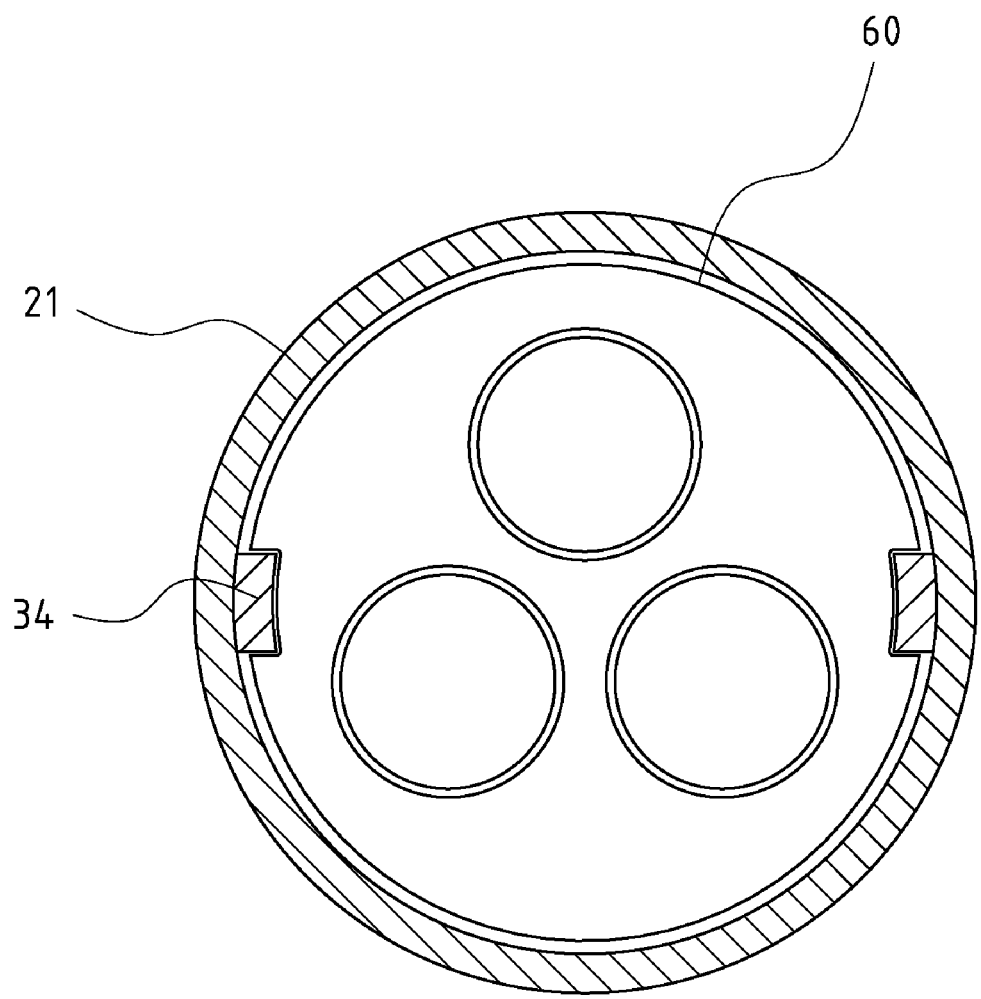
FIG. 8 shows a sectional view of the limiting and locking of the spool parts of the present invention.

When the main body 21 is locked securely with the combined base 22, the circular portion 31 of the combined base 22 overlaps the wall of the main body 21 (shown in FIG. 6), so the actual diameter of the inner space is ΦA. When the main body 21 is locked securely with the combined base 22B, only the bulge 54 of the combined base 22B partially overlaps the wall of the main body 21 (shown in FIG. 7), so the actual diameter of the inner space is ΦB, ΦB>ΦA. That is, the wall thickness loss could be reduced, so the spare parts of different dimensions and specifications are suitable for a wider range of applications.

Additionally, when the spare parts of the switching valve assembly 10 are assembled separately, the bulge 54 protruded from top of the combined base 22B could also be used as a locating portion for fixation of the spool parts 60.

I claim:
1. A water control valve apparatus comprising:
a valve shell having a main body and a combined base, said main body having a wall and an interior, said main body having a plurality of holes formed through said wall adjacent a bottom of said main body, said plurality of holes being in spaced circumferential relation to each other, said combined base being an annular member having an upper edge and a wall and an interior, said wall of said combined base having an inner surface and an outer surface, said combined base having a plurality of bulges extending upwardly from said upper edge at said inner surface, each of said plurality of bulges having a snapping member extending outwardly therefrom so as to extend toward said outer surface, the snapping member of said plurality of bulges of said combined base being received respectively in said plurality of holes of said main body, said combined base having a plurality of holes extending through said wall thereof adjacent a bottom thereof; and
a switching valve assembly having a brake deflector assembly and an upper switching valve seat and a lower switching valve seat and a watertight ring received in said main body of said valve shell.

* * * * *